United States Patent
O'Brien et al.

(10) Patent No.: US 9,768,111 B2
(45) Date of Patent: Sep. 19, 2017

(54) MITIGATING ELECTROMIGRATION EFFECTS USING PARALLEL PILLARS

(71) Applicant: ORACLE INTERNATIONAL CORPORATION, Redwood Shores, CA (US)

(72) Inventors: Mark O'Brien, Irvine, CA (US); James G. Ballard, Palo Alto, CA (US); Kiran Vedantam, Santa Clara, CA (US); Mini Nanua, Cedar Park, TX (US); Salvatore Caruso, Morgan Hill, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 116 days.

(21) Appl. No.: 14/958,109

(22) Filed: Dec. 3, 2015

(65) Prior Publication Data

US 2016/0086884 A1     Mar. 24, 2016

Related U.S. Application Data

(62) Division of application No. 13/785,457, filed on Mar. 5, 2013, now Pat. No. 9,235,674.

(51) Int. Cl.
| | |
|---|---|
| *G06F 17/50* | (2006.01) |
| *H01L 23/00* | (2006.01) |
| *H01L 23/522* | (2006.01) |
| *H01L 23/528* | (2006.01) |

(52) U.S. Cl.
CPC ...... *H01L 23/5225* (2013.01); *G06F 17/5077* (2013.01); *H01L 23/522* (2013.01); *H01L 23/528* (2013.01); *H01L 23/5226* (2013.01); *G06F 17/5081* (2013.01); *G06F 2217/76* (2013.01); *G06F 2217/82* (2013.01); *H01L 2924/0002* (2013.01)

(58) Field of Classification Search
CPC ............ G06F 17/5077; G06F 17/5081; G06F 2217/76; G06F 2217/82; H01L 23/5225; H01L 23/522; H01L 23/5226; H01L 23/528; H01L 2924/0002
USPC .... 716/130, 129, 119; 326/101, 102, 103, 9, 326/31; 257/387
See application file for complete search history.

(56) References Cited

U.S. PATENT DOCUMENTS

| | | |
|---|---|---|
| 4,973,378 A | 11/1990 | Lee et al. |
| 6,323,559 B1 | 11/2001 | Chan et al. |
| 6,928,401 B1 | 8/2005 | Wanek |

(Continued)

*Primary Examiner* — Phallaka Kik
(74) *Attorney, Agent, or Firm* — Cooper Legal Group, LLC

(57) ABSTRACT

Systems, methods, and other embodiments associated with an integrated circuit that includes a plurality of parallel pillar structures is described. In one embodiment, an integrated circuit includes a series of layers. The series of layers include a plurality of pillar metals in each of the series of layers. Pillars within each of the series of layers are oriented to be parallel. Pillars in adjacent layers are aligned to be perpendicular. Each of the plurality of pillar metals is a rectangular segment of metal. The plurality of pillar metals form a reconvergent mesh grid. The series of layers includes a plurality of vias connecting the plurality of parallel pillar metals between the series of layers. Vias of the plurality of vias are located at intersections in the reconvergent mesh grid.

14 Claims, 10 Drawing Sheets

(56) References Cited

U.S. PATENT DOCUMENTS

| | | | |
|---|---|---|---|
| 7,042,747 B1* | 5/2006 | Castagnetti | G11C 15/04 365/189.07 |
| 8,276,002 B2 | 9/2012 | Dennard et al. | |
| 8,729,702 B1 | 5/2014 | Niu et al. | |
| 2004/0136045 A1 | 7/2004 | Tran | |
| 2004/0153985 A1 | 8/2004 | Paul et al. | |
| 2005/0207092 A1 | 9/2005 | Kubota et al. | |
| 2006/0019414 A1* | 1/2006 | Wang | G01R 31/2853 438/14 |
| 2009/0075422 A1 | 3/2009 | Machida | |
| 2009/0085120 A1* | 4/2009 | Lu | H01L 21/31144 257/368 |
| 2009/0108466 A1 | 4/2009 | Richter et al. | |
| 2009/0230555 A1 | 9/2009 | Chapple-Sokol et al. | |
| 2010/0090308 A1* | 4/2010 | Sardana | H01L 23/5223 257/532 |
| 2013/0154128 A1* | 6/2013 | Wang | H01L 23/5286 257/786 |
| 2014/0024212 A1 | 1/2014 | Ryan et al. | |
| 2014/0101626 A1 | 4/2014 | Yu et al. | |
| 2014/0131878 A1 | 5/2014 | Gambino et al. | |

* cited by examiner

MITIGATING ELECTROMIGRATION EFFECTS USING PARALLEL PILLARS

CROSS-REFERENCE TO RELATED APPLICATION

This disclosure is a divisional of U.S. application Ser. No. 13/785,457 filed on Mar. 5, 2013.

BACKGROUND

The electromigration effect refers to the transport of material of a conductor (e.g., a metal wire) caused by a gradual movement of ions in the conductor. The transport of material occurs when momentum is transferred between conducting electrons and diffusing metal atoms of the conductor. This movement of material within the conductor can lead to a thinning of the conductor and eventually complete failure (i.e., disconnected wire).

Additionally, electromigration effects become a greater difficulty in integrated circuits as designs achieve higher signal switching frequency and smaller metal geometries. The greater difficulty is caused by a higher flow of electrons through the smaller metal geometries, which results in increased migration of the conductor and, therefore, faster or more frequent failure. Existing remedies to mitigate electromigration effects within integrated circuits quickly become inadequate to resolve dramatically increasing numbers of electromigration fails on circuits with smaller metal geometries and higher switching frequencies. Existing remedies are also limited by increasingly stringent and complex design rules set by integrated circuit manufacturers as technologies advance over time.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments are described herein that are associated with mitigating electromigration effects in an integrated circuit by using parallel pillar structures. The electromigration effect can cause connectors (e.g., wires, also referred to as metal routes) in an integrated circuit to fail if the integrated circuit is not designed to properly account for the electromigration effect. For example, a design of an integrated circuit uses a via to connect a metal route (e.g., a wire) of one layer with a metal route of another layer. Generally, one via (i.e., a single-cut via) is provided for each connection point between layers. However, a single-cut via may not provide a sufficient connection to mitigate electromigration effects due to a limited size of the single-cut via in relation to, for example, the amount of electrical current to charge a capacitive load carried by the single-cut via. Thus, in some instances, multiple vias (i.e., a multi-cut via) may be provided for each connection point between layers to mitigate electromigration effects by distributing the electrical current to charge capacitive load across more connection points. Additionally, metal routes may be widened to further mitigate electromigration effects.

Using wider wires and multi-cut vias can reduce electromigration effects on the integrated circuit by providing wider and additional pathways for the flow of current. However, widening wires and adding the multi-cut vias often causes increased design rule checking (DRC) difficulties during design of the integrated circuit. Accordingly, in one embodiment, an electronic design automation (EDA) tool for designing integrated circuits is configured to mitigate electromigration effects by designing an integrated circuit with a series of layers that include parallel pillar metals (i.e., metal bar interconnects). The parallel pillar metals are parallel segments of metal that are designed to alternate in direction with each layer of the integrated circuit to create a reconvergent mesh grid throughout the layers. The reconvergent mesh grid avoids DRC difficulties and complications during manufacturing by using, for example, only single-cut vias and minimum width metals defined in an integration circuit or manufacturing process.

Figure 1:
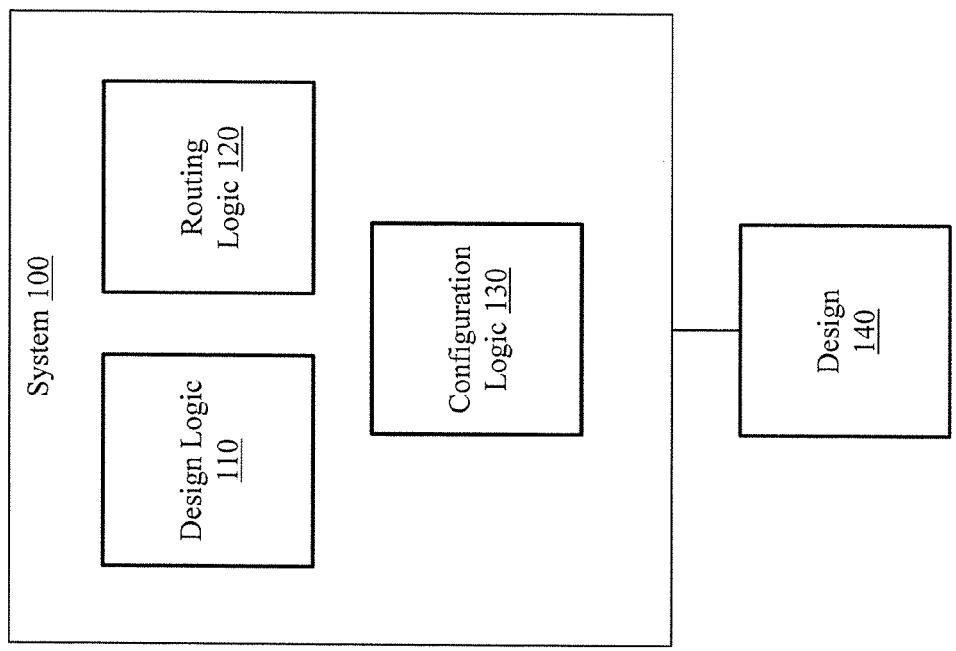
FIG. 1 illustrates one embodiment of a system associated with mitigating electromigration effects in an integrated circuit by using parallel pillar structures.

With reference to FIG. 1, one embodiment of a system 100 associated with designing an integrated circuit to include parallel pillar structures is illustrated. The system 100 includes a design logic 110, a routing logic 120, and a configuration logic 130. The logics 110-130 operate to automatically produce a design 140 of an integrated circuit that includes elements (e.g., a plurality of pillar metals) designed to mitigate electromigration effects.

Consider that an integrated circuit includes many different layers that form transistors, capacitors, resistors, wires, bonding sites, insulating layers, and so on. The different layers are typically segmented into two groups, front end of line (FEOL) layers and back end of line (BEOL) layers. In general, the FEOL layers are fabricated first and include, for example, transistors (e.g., CMOS), resistors, and/or capacitors. The BEOL layers are fabricated on top of the FEOL layers. The BEOL layers (also referred to as the metal layers) include wires or metal routes that interconnect elements of the FEOL layers. That is, the BEOL layers connect elements of the FEOL layers to form circuits. The FEOL and BEOL layers form an integrated circuit that may be disposed within an integrated circuit package.

In one embodiment, the BEOL layers include multiple layers (e.g., 2, 3, 4, or more) of wire interconnects, as defined by the manufacturing process. Accordingly, the design 140 for the integrated circuit is complex. Often, a design tool such as an electronic design automation (EDA or ECAD) tool is used to design (e.g., place components, route wires, and so on) the integrated circuit due to the complexity and scale of the design 140. The EDA tool can be configured to account for various problems (e.g., electromigration effects) and ensure that designs do not violate rules (e.g., design rule checking (DRC)) that prevent problems in the integrated circuit. In general, a design produced by the EDA tool is provided to a fabrication device to fabricate an integrated circuit from the design and as specified by the design to avoid difficulties such as electromigration effects by fabricating the integrated circuit with the parallel pillar structures.

With continued reference to FIG. 1, the design 140 represents a design of an integrated circuit that includes both FEOL and BEOL layers. However, for purposes of this disclosure, reference to the design 140 refers to, in general, the BEOL layers of the integrated circuit and not the FEOL layers. Accordingly, in one embodiment, the system 100 is an EDA tool, a non-transitory computer-readable medium configured to execute on a device and cause the device to operate as disclosed, or other automated device that assists a user in producing BEOL layers of the design 140.

For example, the configuration logic 130 is configured to receive input that specifies parameters for producing the design 140. The parameters can include a driver size (i.e., describing a rate of electrical current generated by a circuit device output in the integrated circuit), a resistivity of a metal to be used for a plurality of pillar metals in the integrated circuit, a switching frequency of electrical signals carried by the plurality of pillar metals, an amount of capacitive load to be carried by the plurality of pillar metals, an indicator of whether to use parallel pillar metals to mitigate electromigration effects, and so on. In general, the parameters specify information that influences how the metal layers are to be configured in the design 140. Accordingly, in one embodiment, the configuration logic 130 configures the system 100 to use a plurality of pillar metals in the design 140 of the integrated circuit.

The plurality of pillar metals are, for example, rectangular segments of metal in each layer of the design 140 that are to carry electrical signals between different components of the integrated circuit. In one embodiment, the plurality of pillar metals are configured to carry electrical current to various components of the integrated circuit by connecting the various components to a circuit device output (e.g., a driver pin).

When determining how to route the plurality of pillar metals in the design 140, the system 100 accounts for many different considerations. For example, the design logic 110 is configured to analyze the design 140 of the integrated circuit to identify open tracks for routing the pillars. That is, the design logic 110 determines locations of existing wires and other existing structures in the BEOL layers of the design 140 and constructs, for example, a map or graph of the locations of existing structures. Upon determining the locations of existing structures in the design 140, the design logic 110 maps open tracks or free spaces with no existing structures where the plurality of pillar metals can be placed. In this way, the design logic 110 can identify different possible spaces in each layer that do not include structures which would obstruct routing the plurality of pillar metals.

Once the design logic 110 identifies the open tracks in the design 140, the routing logic 120 routes the plurality of pillar metals in each of the layers (i.e., the BEOL layers) of the design 140. In one embodiment, the routing logic 120 successively routes the plurality of pillar metals in each layer of the design until, for example, a driver pin from a first layer (e.g., a driver pin layer) is connected to a structure in a final layer (e.g., a fourth layer). The final layer is an available metal layer in the manufacturing process. For example, the configuration logic 130 selects the final layer to include lower layers affected by electromigration effects. That is, the configuration logic 130 selects the final as, for example, a stopping point for routing the plurality of pillar metals. Accordingly, the design logic 110 begins by locating the driver pin in a first layer (i.e., the driver pin layer) and routing the plurality of pillar metals starting at a layer above the first layer/driver pin layer in order to connect the driver pin layer with the plurality of pillar metals. The driver pin and the driver pin layer are, for example, a connection to a component/structure in the FEOL layers of the integrated circuit such as a voltage source or other component.

Furthermore, the routing logic 120 is configured to route the plurality of pillar metals in the design 140 based, at least in part, on the parameters (e.g., an amount of capacitive load to be carried by the plurality of pillar metals) and the location of the existing structures. The routing logic 120 uses the parameters to select, for example, a number of parallel pillar metals in each layer, a width of pillar metals in each layer, number of metal layers in the pillar, and so on.

In addition to routing the plurality of pillar metals in each layer of the design 140, the routing logic 120 is also configured to generate via connections in the design 140 where the plurality of pillar metals overlap between adjacent metal layers. That is, the routing logic 120 generates a through connection (i.e. a via) in the design 140 to connect pillars in a first layer and pillars in a second layer when a pillar in the first layer overlaps a pillar in the second layer that is adjacent to the first layer. In general, this technique results in a plurality of via connections between each layer. For example, if N (e.g., 3) represents a number of pillars in the first layer, and M (e.g., 2) represents a number of pillars in the second layer, then a number of vias between the first layer and the second layer is equal to N×M (e.g., 2×3=6 vias).

The equation N×M is true for the number of vias between two layers so long as the plurality of pillar metals in each layer are symmetric. For example, when the routing logic 120 truncates pillars in a layer so that they are shorter in length to avoid other structures, then a number of vias will be less. The number of vias is less because a number of overlaps between pillars will be diminished due to the asymmetry of the truncated pillars. In another embodiment, the number of vias (e.g., a max number of vias per layer) may be specified by the parameters when configuring the system 100. When the number of vias are specified by the parameters the routing logic 120 will not generate more vias than identified by the parameters.

Additionally, consider that each layer may include many (e.g., thousands of) pillar metals. Further consider that in some examples pillar metals in a layer may not be fully symmetric but instead are asymmetrically distributed or are only locally symmetric. That is, for example, in a particular design of an integrated circuit, pillars may be confined to certain areas above the circuit device output pin (i.e., the driver pin) where enough space exists to insert pillar metals.

Additionally, each metal layer may have different spacing requirements or may include unrelated metal structures that block space for routing pillar metals. Thus, the routing logic 120 is configured to shift locations of pillar metals on each layer to adapt and fit the pillar metals into local route structures. In this case, a distribution of the pillar metals is locally symmetric but not symmetric across all of the layers. Additionally, the pillar metals may be distributed within two separate disconnected regions of a single layer (e.g., in an upper left corner and a lower right corner), and so on. In general, the design 140 of the plurality of pillar metals may take many different forms and should not be construed as only being configured as a single uniform symmetric grid. The system 100 is configured to uniquely produce the design 140 to accommodate specifics of a particular integrated circuit and structures within that integrated circuit.

Figure 6:
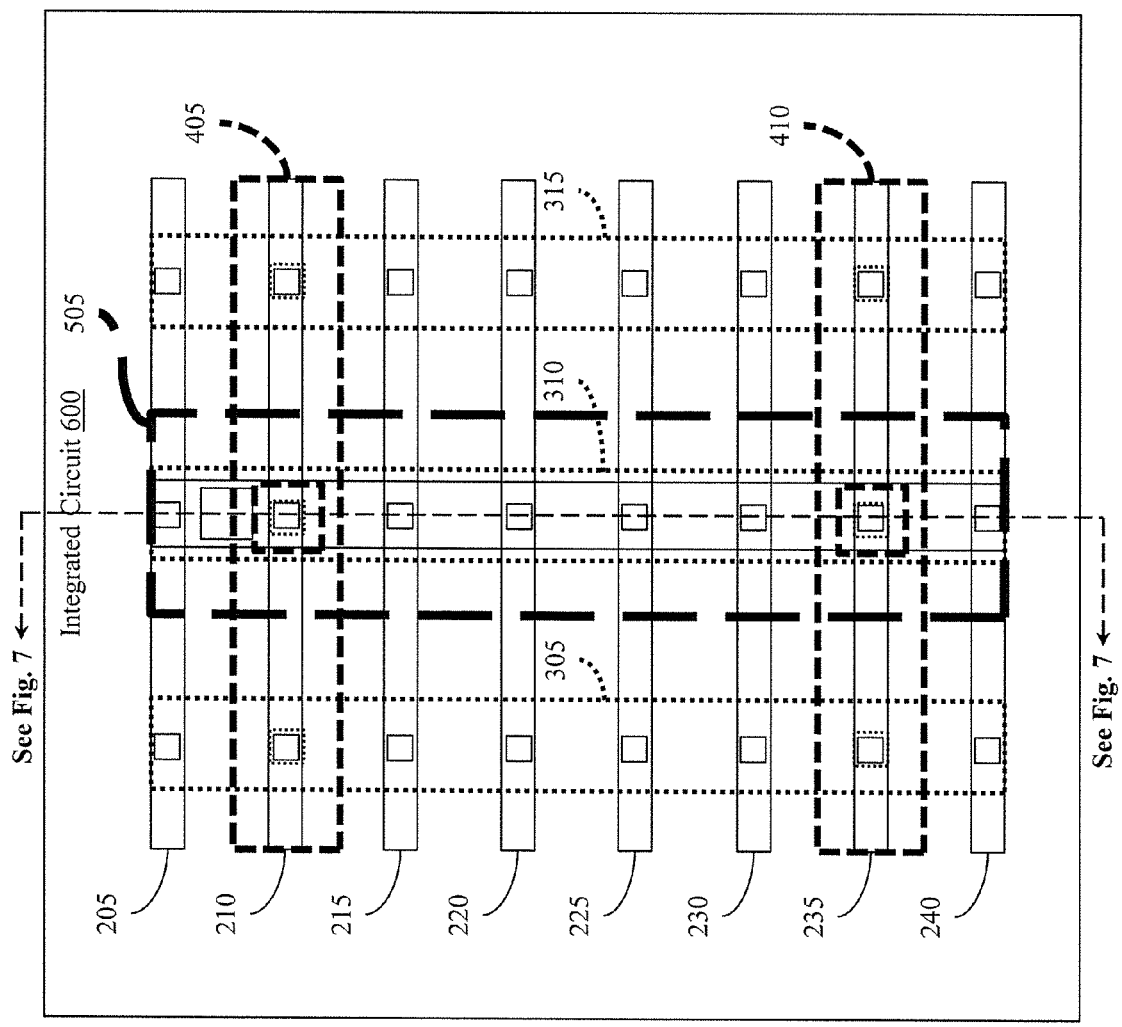
FIG. 6 illustrates a bottom up cross section of an integrated circuit configured with parallel pillar structures for mitigating electromigration effects.
Figure 7:
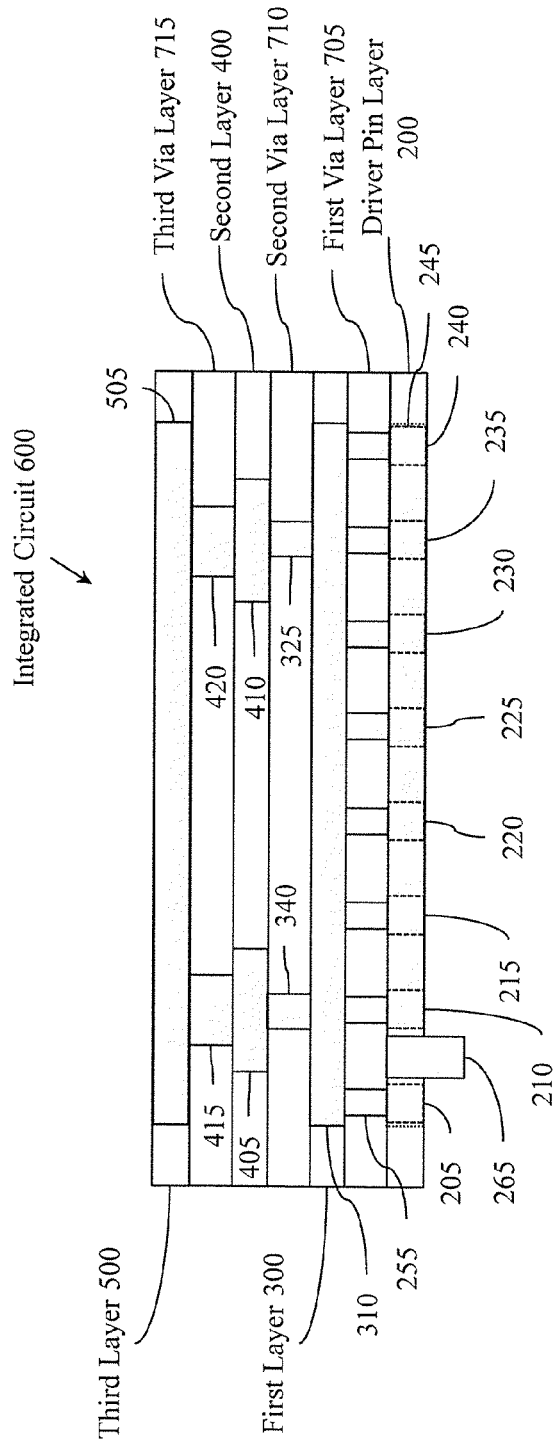
FIG. 7 illustrates a side cross section of an integrated circuit configured with parallel pillar structures for mitigating electromigration effects.
Figure 8:
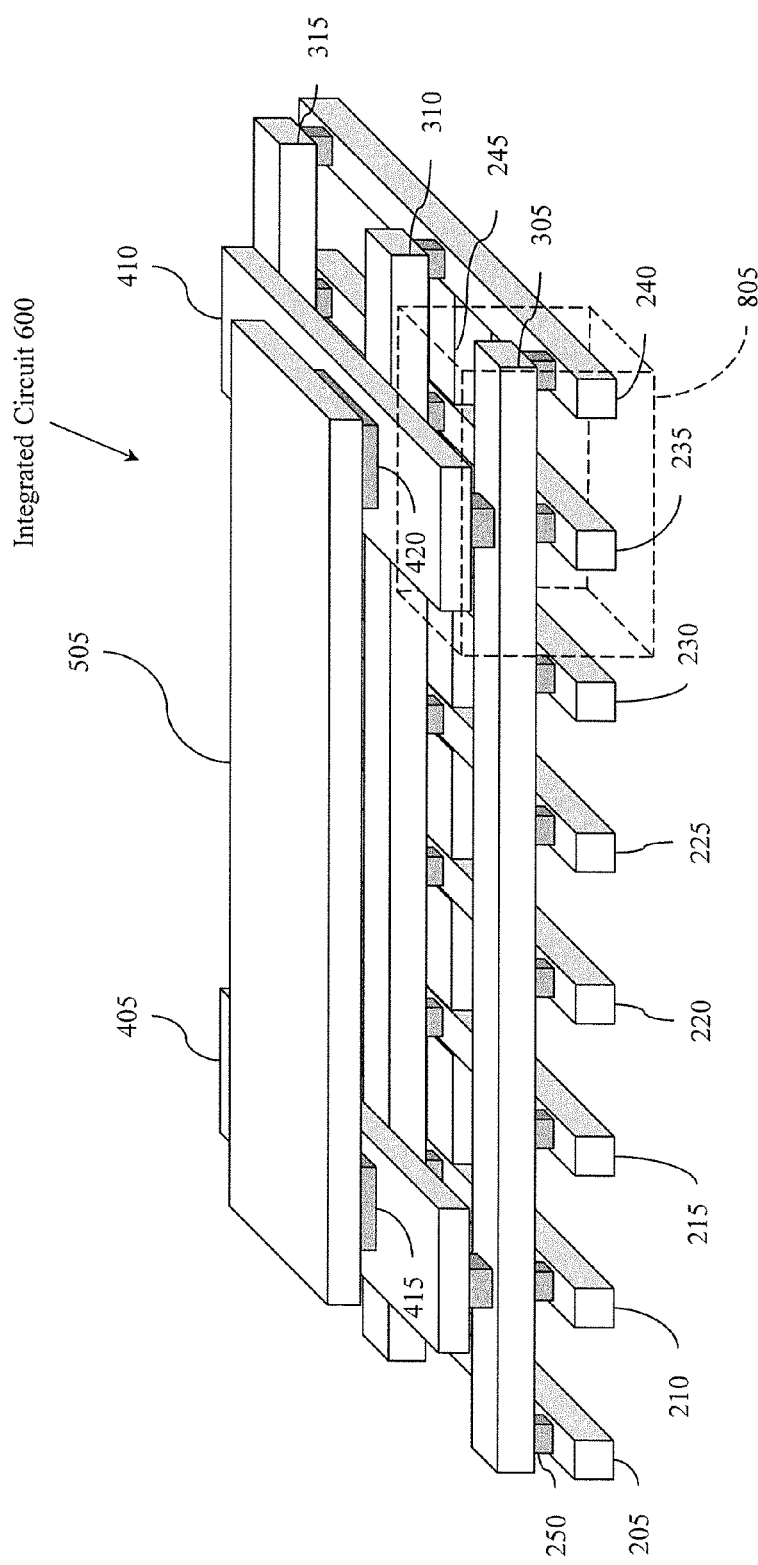
FIG. 8 illustrates a three-dimensional view of an integrated circuit configured with parallel pillar structures for mitigating electromigration effects.

Further aspects of the system 100 will be discussed with reference to FIGS. 2-8. In general, FIGS. 2-8 illustrate a design (e.g., the design 140) of an integrated circuit 600 that is configured with a plurality of pillar metals. FIGS. 2-5 illustrate different layers of the integrated circuit 600. FIGS. 6-8 illustrate different views of the integrated circuit 600. FIGS. 2-8 will be discussed with reference to the system 100 of FIG. 1.

Figure 2:
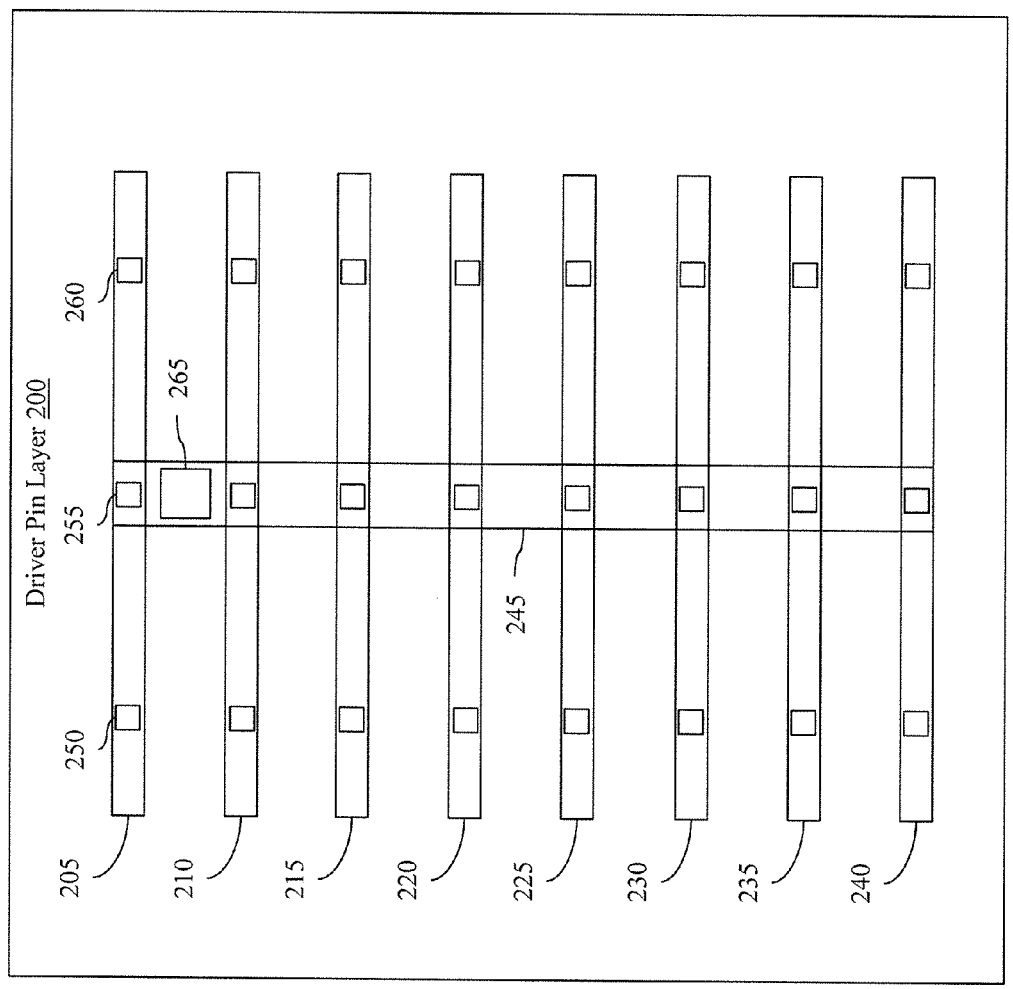
FIG. 2 illustrates a driver pin layer of an integrated circuit configured with parallel pillar structures for mitigating electromigration effects.

FIG. 2 illustrates a driver pin layer 200 of the design 140. The driver pin layer 200 includes pillars 205, 210, 215, 220, 225, 230, 235, and 240. The pillars 205, 210, 215, 220, 225, 230, 235, and 240 are composed of, for example, copper, aluminum, an alloy, or another conducting metal. Pillars in the first layer 200 are connected with a spine 245. The spine 245 interconnects the pillars 205-240 to distribute, for example, current across all of the pillars 205-240.

The first layer 205 is also illustrated with via connections 250, 255, and 260 on the pillar 205 and similar via connections on the pillars 210-240. The via connections (e.g., 250-260) of the first layer 200 are single-cut vias that connect the driver pin layer 200 of FIG. 2 and a first layer 300 of FIG. 3. Furthermore, the design logic 110 generates the vias (e.g., 250-260) of FIG. 2 in the design 140 at points of overlap with pillars of FIG. 3. In general, the driver pin layer 200 is similar to metal layers 300-500 of the design 140. However, in one embodiment, the driver layer 200 is a static structure that is placed within the design and not dynamically generated.

The interconnected plurality of pillars 205-240 along with the vias (e.g., 250-260) to the third layer 300 mitigate electromigration effects by providing a redundant network of paths for the flow of electricity between the driver pin layer 200 and the first layer 300. Additionally, the plurality of pillars 205-240 along with the vias connect the first layer 300 with a driver pin 265. The driver pin 265 is, for example, a voltage source pin or other connection for an electrical signal to lower layers of the integrated circuit 600. The lower layers are FEOL layers (not shown) of the integrated circuit 600 that include transistors and other components. Additionally, as illustrated in FIGS. 2-8, the driver pin 265 represents a logical driver pin connection and may be physically constructed and connected to FEOL layers with additional metal layers or via connections other than as shown presently in FIGS. 2-8.

The routing logic 120 of FIG. 1 generates the driver pin layer 200 in the design 140. In this way, the system 100 avoids difficulties with design rule checking (DRC) errors, e.g., minimum metal or via spacing errors, via enclosure errors, pillar metal width errors, and so on. The design 140 for the driver pin layer 200 avoids the DRC errors by simplifying and avoiding wide metals or multi-cut vias that must comply with more complex manufacturing design rules.

Figure 3:
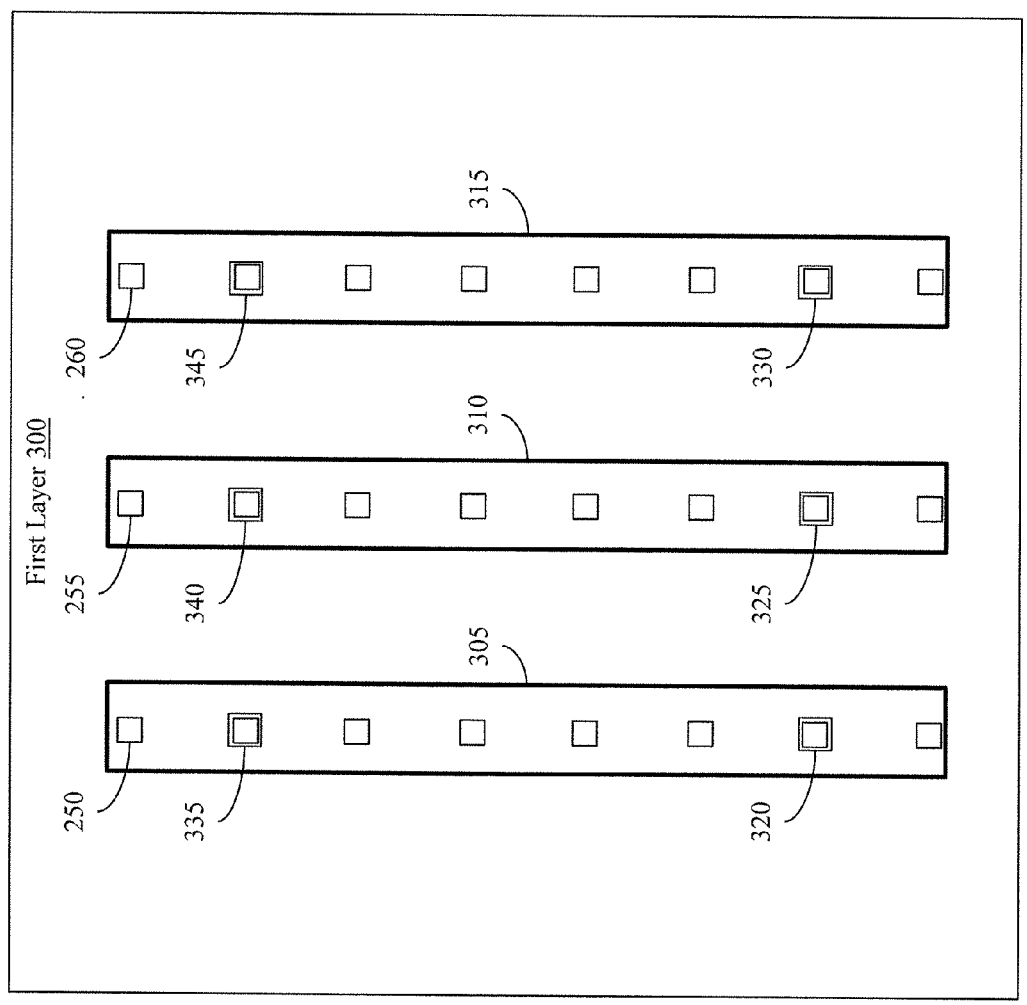
FIG. 3 illustrates a first layer of an integrated circuit configured with parallel pillar structures for mitigating electromigration effects.

Continuing to FIG. 3, the first layer 300 of the design 140 of the integrated circuit 600 is illustrated. The routing logic 120 of FIG. 1, routes the pillar metals 305, 310, and 315 to be parallel and substantially symmetric in the design 140. In this way, the system 100 avoids difficulties with design rule checking (DRC) errors, e.g., minimum metal or via spacing errors, via enclosure errors, pillar metal width errors, and so on. The design 140 for the first layer 300 avoids DRC errors by simplifying and avoiding wide metals or multi-cut vias that must comply with more complex manufacturing design rules.

As seen in FIG. 3, the pillar metals 305, 310, and 315 are oriented to be parallel and substantially symmetrically spaced. However, the pillar metals 305, 310, and 315 are oriented opposite to pillar metals 205-240 of FIG. 1. That is, the pillar metals 305-315 are perpendicular to the pillars 205-240 to comply with manufacturing design rules. In this way, the pillar metals of the driver pin layer 200 and the first layer 300 form a reconvergent mesh grid when viewed from above, since the pillar metals of each layer are perpendicular. At intersection points in the mesh grid where the pillar metals 305-310 and 205-240 meet, the routing logic 120 generates the vias (e.g., 250-260) in the design 140 to connect the first layer 200 and the second layer 300. Similarly, the routing logic 120 generates vias 320, 325, 330, 335, 340, and 345 to connect the first layer 300 with pillar metals of a second layer 400 of FIG. 4.

In some manufacturing technologies, pillar metals and vias in higher layers are wider than lower layers. That is, with each layer a width of each pillar is greater as a result of, for example, manufacturing constraints. Consequently, successively routing the plurality of pillar metals in each layer includes routing, for example, a first number of pillars in the first layer 300 and a second fewer number of pillar metals in the second layer 400, and so on. This principle is further illustrated in FIGS. 4-5. In yet other manufacturing technologies, metals and vias of equal size or width are used on several consecutive metal layers. For these cases, a same number of pillar metals are routed in each layer. For example, a first number of pillars in the first layer 300 are the same as a number of pillar metals in the second layer 400.

Figure 4:
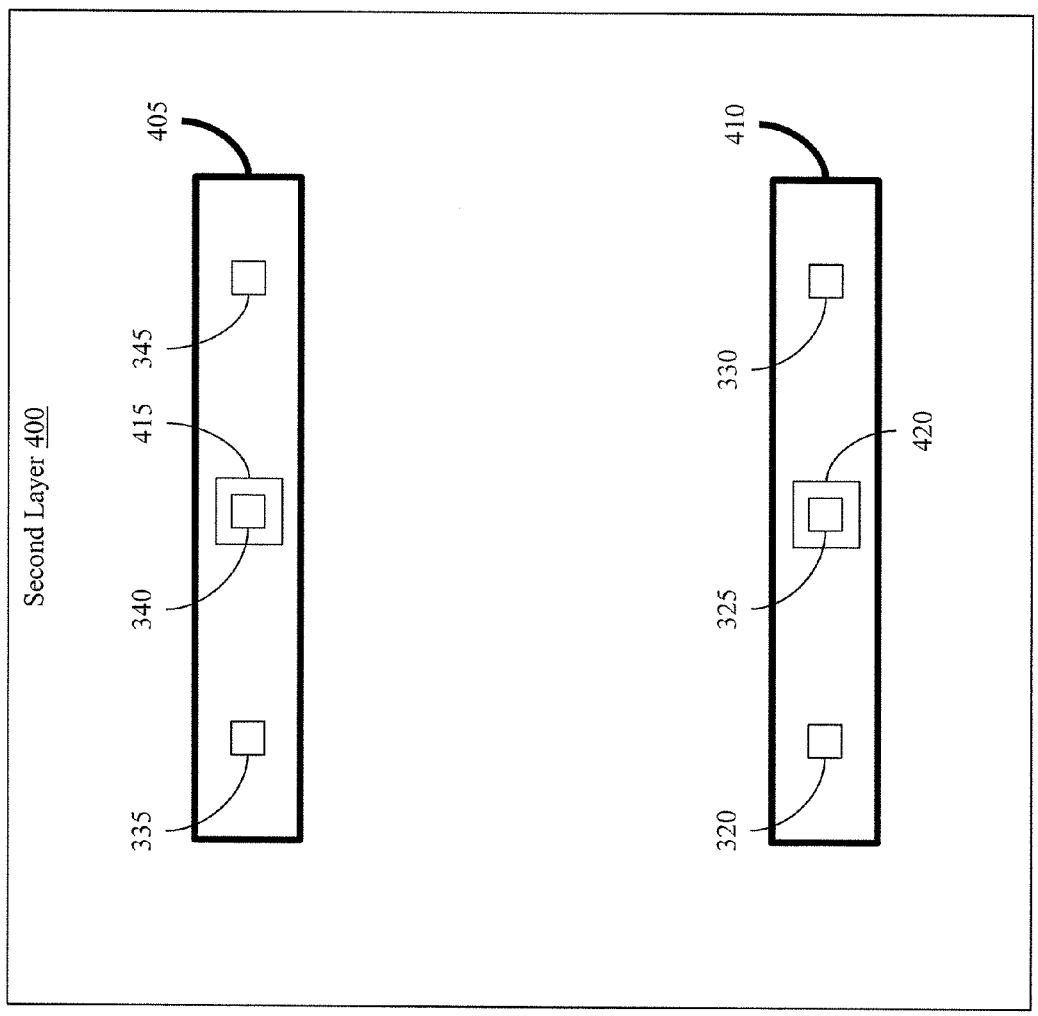
FIG. 4 illustrates a second layer of an integrated circuit configured with parallel pillar structures for mitigating electromigration effects.

FIG. 4 illustrates a second layer 400 of the integrated circuit 600 that includes two pillar metals 405 and 410. The pillar metals 405 and 410 are each wider than, for example, pillar metals 205-240 and pillar metals 305-315 from previous layers. Additionally, the pillar metals 405 and 410 are perpendicular to the pillar metals 305-315 of the first layer 300. FIG. 4 illustrates vias 320-345, which connect the second layer 400 with the first layer 300. Additionally, vias 415 and 425 connect the second layer 400 with a third layer 500 of FIG. 5.

Figure 5:
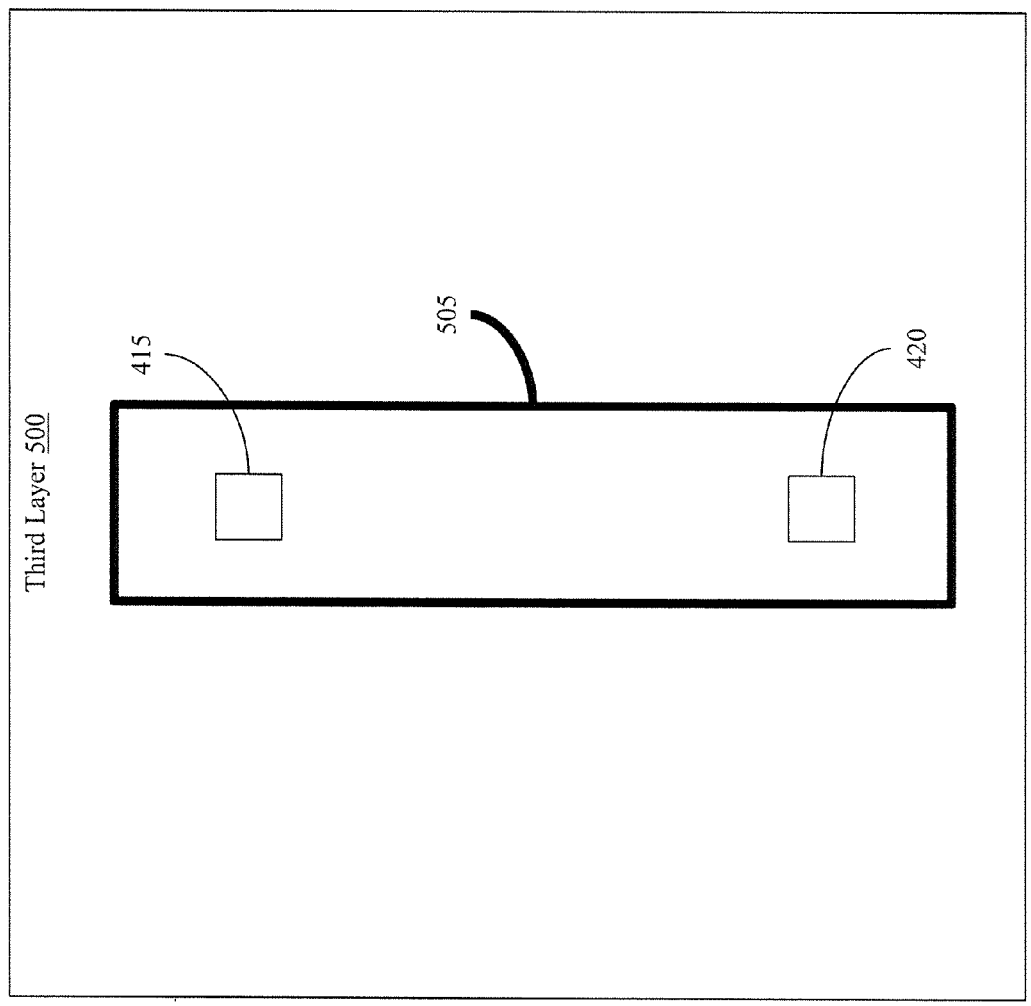
FIG. 5 illustrates a third layer of an integrated circuit associated with mitigating electromigration effects in an integrated circuit by using parallel pillar structures.

FIG. 5 illustrates the third layer 500 with a single pillar 505 and via connections 415 and 420 to the second layer 400. The third layer 500 is a final layer of the design 140.

Accordingly, the third layer 500 can include connections to bonding sites and other elements/structures outside or inside of the integrated circuit 600.

FIG. 6 illustrates a bottom up view (i.e., footprint) of the integrated circuit 600 from the perspective of the first layer 200. Each layer (e.g., 200, 300, 400, and 500) is shown with a different style of line. The plurality of pillar metals, as illustrated in FIG. 6, depict a comparative orientation of the plurality of pillar metals and how each successive layer includes pillar metals that are perpendicular to pillar metals of layers both above and beneath. Furthermore, FIG. 6 illustrates how the routing logic 120 generates vias at intersection of the plurality of pillar metals and comparative differences in widths between pillar metals and vias of different layers. While the plurality of pillar metals are illustrated as generally covering a whole of the footprint, of course, in one embodiment, the plurality of pillar metals are confined to a quadrant, subsection, or area of the footprint of the overall integrated circuit that is a percent (e.g., 1 percent or less) of the overall area of the footprint of the integrated circuit. In this way, the plurality of pillar metals can be used to mitigate electromigration effects for particular networks that are confined to a particular location within the design. Additionally, the integrated circuit may include multiple separate grids of pillar metals that are electrically isolated and carry separate electric signals or power sources in different areas of the footprint (e.g., different subsections or quadrants).

FIG. 7 illustrates a cross-section of the integrated circuit 600 of FIG. 6. In FIG. 7, the integrated circuit 600 is shown with via layers that include a first via layer 705, a second via layer 710, and a third via layer 715. The via layers 705-715 include vias (e.g., 255, 325, 340, 415, and 420) that form connections between the layers 200-500 and also insulating material that insulates the layers from the flow of electricity where there is no via connection. FIG. 7 further illustrates how the circuit device output pin 265 (e.g., driver pin) may extend downward into the FEOL layers of the integrated circuit 600 to form a connection with components in the FEOL layers. The driver pin 265 represents a logical driver pin connection and may be physically constructed and connected to FEOL layers with additional metal layers or via connections other than as shown presently in FIG. 7.

FIG. 8 illustrates a three-dimensional view of the integrated circuit 600. In FIG. 8, the plurality of pillar metals (e.g., 205-240, 305-315, 405, 410, and 505) are illustrated with vias, but with all insulating material removed in order to show the design of the plurality of pillar metals and the vias. Additionally, FIG. 8 does not illustrate additional structure (e.g., wires) which may be present in the layers 200-500 of the integrated circuit 600. While FIGS. 2-8 generally illustrate the plurality of pillar metals distributed in a symmetric manner, in some embodiments, the routing logic 120 may map one or more pillar layers to be spaced unevenly or with portions truncated in order to avoid structures in a same layer.

For example, consider the pillar metals 235, 240, 305, and 410 which occur in a lower right quadrant of the integrated circuit 600 as illustrated in FIG. 8 by a dashed box 805. If a structure (e.g., a wire or series of wires) existed in a space shown by the box 805, then the pillar metals 235, 240, 305, and 410 would be truncated and would not extend into the box 805. For example, the pillar metals 235 and 240 may be truncated to be half a length of the pillar metals 205-230. Similarly, the pillar metals 305 and 410 may also be shortened; however, remaining portions of the integrated circuit 600 would remain as illustrated. Accordingly, because of existing structure represented by the box 805, pillars in each layer would not be symmetric in this example. Additionally, in another embodiment, instead of, for example, truncating the pillars, spacing between the pillars can be modified or the pillars can be shifted to avoid encroaching on the box 805 or pillars may be completely eliminated. In this way, the parallel structures of the plurality of pillar metals along with multiple vias provide a simple redundant design that reduces effects of electromigration and avoids difficulties (e.g., DRC errors) with complex designs that include wide metals or multi-cut vias.

Figure 9:
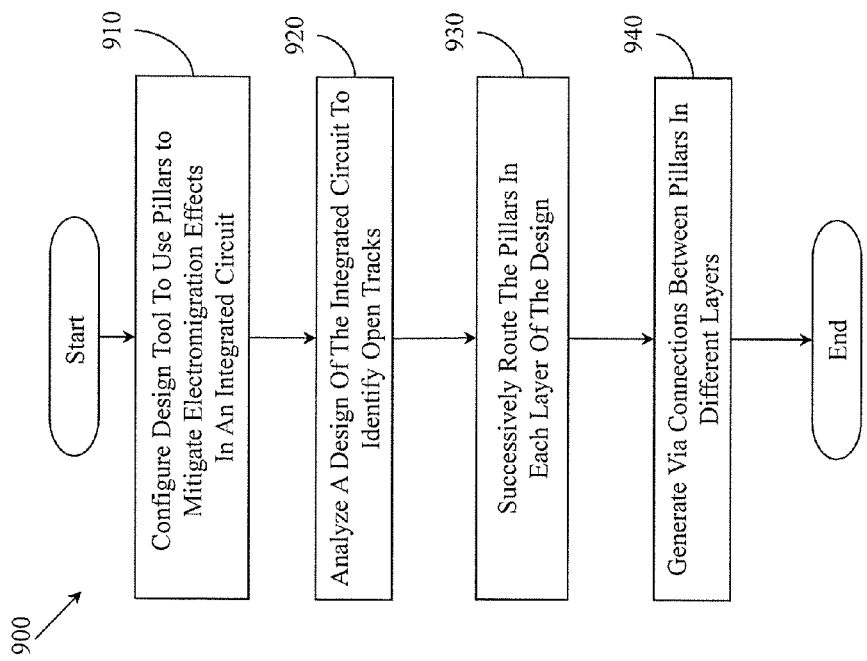
FIG. 9 illustrates one embodiment of a method associated with mitigating electromigration effects in an integrated circuit by using parallel pillar structures.

Further details about designing integrated circuits configured with pillars to mitigate electromigration effects will be discussed with reference to FIG. 9. FIG. 9 illustrates one embodiment of a method 900 associated with designing an integrated circuit that uses a plurality of pillar metals. The method 900 will be discussed from the perspective of the system 100 of FIG. 1.

At 910, the method 900 includes configuring a design tool to mitigate electromigration effects in an integrated circuit. In one embodiment, the design tool is the system 100, which is an electronic design automation (EDA) tool, a very large scale integration (VLSI) tool, or a similar tool. For example, the system 100 configures options for designing an integrated circuit to use a plurality of pillar metals. For example, by using a plurality of pillar metals within layers of the integrated circuit, electromigration effects can be avoided while simplifying design implementation of the integrated circuit.

Accordingly, the system 100 is configured at 910 by receiving one or more parameters that control routing of the plurality of pillar metals in each layer of a design of the integrated circuit. The parameters may include a capacitive load to be carried by the pillars, a switching frequency of signals carried by the pillars, and so on. In general, each of the parameters influence how the system 100 designs the integrated circuit (e.g., pillar metal width, spacing, number of vias, and so on). Therefore, various aspects of the system 100 are configured based, at least in part, on the parameters.

At 920, the system 100 analyzes the design 140 to identify open metal tracks. In one embodiment, analyzing the design 140 to identify open tracks includes constructing a blockage aware route graph that identifies structures in the integrated circuit which obstruct placing pillars in each layer. The open tracks are, for example, spaces in each layer that are free of structures that would obstruct placement of one or more pillar metals or vias.

At 930, the system 100 successively routes the plurality of pillar metals in each of the layers of the design. In one embodiment, the system 100 routes pillars in each layer based, at least in part, on the parameters and the location of the structures identified at 920. That is, the system 100 places pillars in the design beginning in a first layer and then progresses upward through the other layers. The system 100 places the pillars within layers in a parallel orientation and alternates a direction with each layer so that the plurality of pillar metals form a grid pattern when viewed from above or below.

For example, the system 100 begins in a first layer that is closest to the FEOL layers of the design. The system 100 locates a circuit device output pin in an output pin layer that is, for example, connected to a component in the FEOL layers. Upon locating the output pin in the output pin layer, the system 100 places an output pin structure (e.g., similar to the structure of FIG. 2) that is connected to the output pin and then routes pillars in the first layer and so on. The system 100 places the subsequent pillars to avoid structures in each layer and to be as close to symmetric in spacing with each other as possible while still accounting for obstructing structures and the requirements specified by the parameters (e.g., pillar width).

In one embodiment, the system 100 generally avoids other existing metal structures, in some instances, the system 100 moves obstructing structure in order to place one or more pillar metals. The system 100 may move existing structure when, for example, the structure has a low priority for a current placement, placement of a pillar in a specific location has a high priority, and so on. The system 100 decides a priority of a current placement against other existing structures based on parameters specified to the configuration logic 130.

Continuing with the above example, when the system 100 completes placement of pillars in the first layer, pillar metals are placed/routed in successive layers in a similar manner, except successive layers do not include a direct connection to an output pin or output pin layer. Once pillars are placed in all intermediate layers, the system 100 places one or more pillars in a final layer. The final layer is the only layer which connects to any structure outside of the plurality of pillar metals and the vias except the first layer. That is, the intermediate layers (e.g., layers 300-400) do not connect to wire or other structures in their respective or adjacent layers. The first layer connects to a driver/output pin or other structure, but otherwise only the final layer connects to any structure outside of the plurality of pillar metals. In this way, the final layer is a contact between the driver pin and an outside structure.

Once the plurality of pillar metals have been placed, the method 900 continues to 940. At 940, the system 100 generates via connections in the design 140 between the plurality of pillar metals of each layer. The system 100 generates the vias at intersection points in the grid for pillars of adjacent layers. In this way, each layer is connected to a layer below and a layer above to complete connections between the drive pin and the final layer. In one embodiment, a resulting design is electronically provided to a semi-conductor fabrication device using electronic communications to produce an integrated circuit from the design. The integrated circuit includes the plurality of pillar metals in the configuration specified by the design. In this way, the integrated circuit is produced with metal interconnect structures that mitigate electromigration effects.

Figure 10:
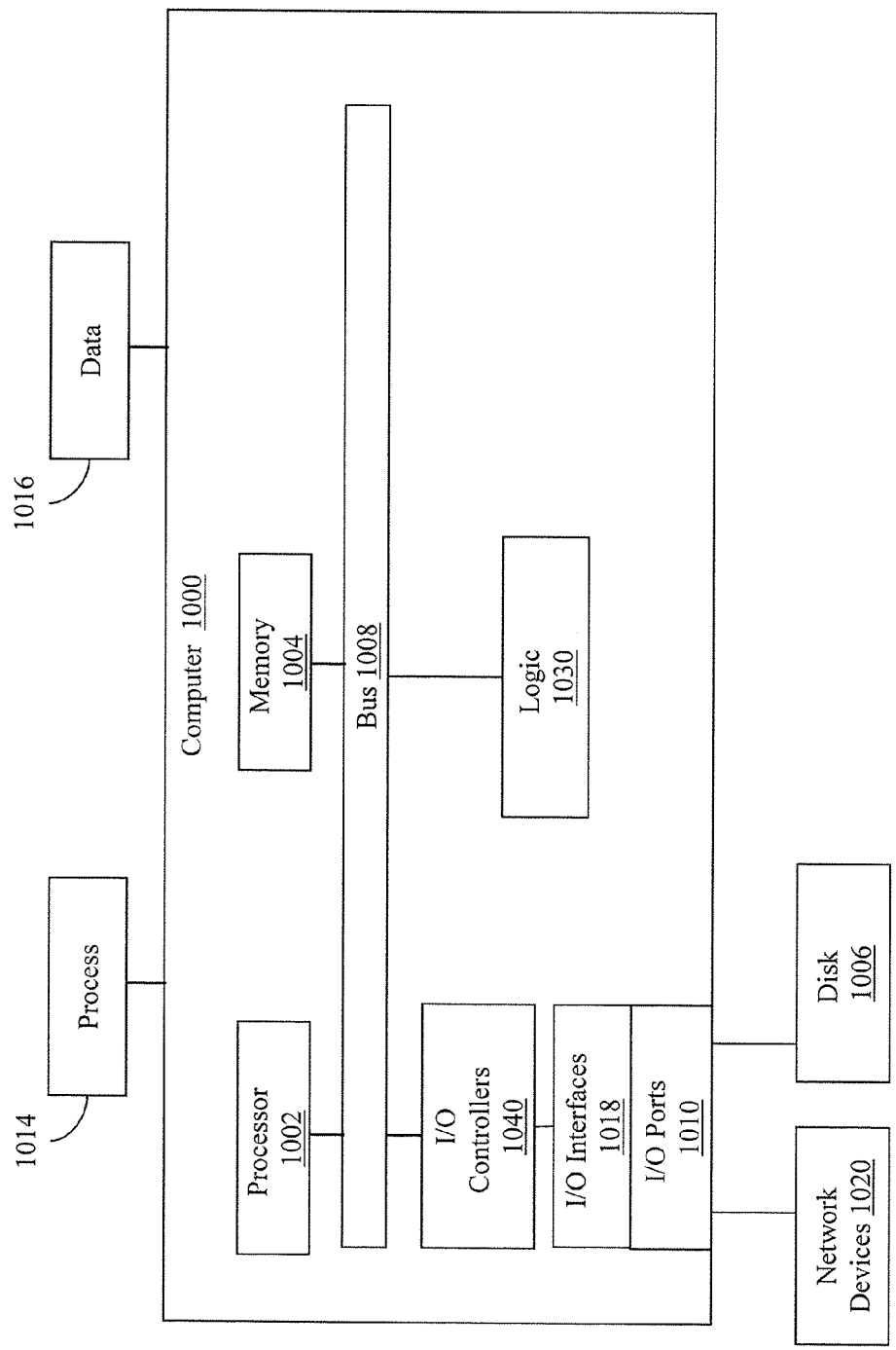
FIG. 10 illustrates an embodiment of a computing system in which example systems and methods, and equivalents, may operate.

FIG. 10 illustrates an example computing device in which example systems and methods described herein, and equivalents, may operate. The example computing device may be a computer 1000 that includes a processor 1002, a memory 1004, and input/output ports 1010 operably connected by a bus 1008. In one example, the computer 1000 may include a logic 1030 configured to mitigate electromigration effects in an integrated circuit by producing a design of the integrated circuit that uses parallel pillars. In different examples, the logic 1030 may be implemented in hardware, a non-transitory computer-readable medium with stored instructions, firmware, and/or combinations thereof. While the logic 1030 is illustrated as a hardware component attached to the bus 1008, it is to be appreciated that in one example, the logic 1030 could be implemented in the processor 1002.

Generally describing an example configuration of the computer 1000, the processor 1002 may be a variety of various processors including dual microprocessor and other multi-processor architectures. A memory 1004 may include volatile memory and/or non-volatile memory. Non-volatile memory may include, for example, ROM, PROM, and so on. Volatile memory may include, for example, RAM, SRAM, DRAM, and so on.

A disk 1006 may be operably connected to the computer 1000 via, for example, an input/output interface (e.g., card, device) 1018 and an input/output port 1010. The disk 1006 may be, for example, a magnetic disk drive, a solid state disk drive, a floppy disk drive, a tape drive, a Zip drive, a flash memory card, a memory stick, and so on. Furthermore, the disk 1006 may be a CD-ROM drive, a CD-R drive, a CD-RW drive, a DVD ROM, and so on. The memory 1004 can store a process 1014 and/or a data 1016, for example. The disk 1006 and/or the memory 1004 can store an operating system that controls and allocates resources of the computer 1000.

The bus 1008 may be a single internal bus interconnect architecture and/or other bus or mesh architectures. While a single bus is illustrated, it is to be appreciated that the computer 1000 may communicate with various devices, logics, and peripherals using other busses (e.g., PCIE, 1394, USB, Ethernet). The bus 1008 can be types including, for example, a memory bus, a memory controller, a peripheral bus, an external bus, a crossbar switch, and/or a local bus.

The computer 1000 may interact with input/output devices via the i/o interfaces 1018 and the input/output ports 1010. Input/output devices may be, for example, a keyboard, a microphone, a pointing and selection device, cameras, video cards, displays, the disk 1006, the network devices 1020, and so on. The input/output ports 1010 may include, for example, serial ports, parallel ports, and USB ports.

The computer 1000 can operate in a network environment and thus may be connected to the network devices 1020 via the i/o interfaces 1018, and/or the i/o ports 1010. Through the network devices 1020, the computer 1000 may interact with a network. Through the network, the computer 1000 may be logically connected to remote computers. Networks with which the computer 1000 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Logic", as used herein, includes a computer or electrical hardware component(s), firmware, a non-transitory computer readable medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components.

"User", as used herein, includes but is not limited to one or more persons, computers or other devices, or combinations of these. While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim. To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d. Ed. 1995).

What is claimed is:

1. An integrated circuit, comprising:
a series of layers comprising:
a plurality of pillar metals in each of the series of layers, wherein pillars within each of the series of layers are oriented to be parallel, wherein pillars in adjacent layers are aligned to be perpendicular, wherein each of the plurality of pillar metals is a rectangular segment of metal, and wherein the plurality of pillar metals form a reconvergent mesh grid; and
a plurality of vias connecting the plurality of parallel pillar metals between the series of layers, wherein vias of the plurality of vias are located at intersections in the reconvergent mesh grid.

2. The integrated circuit of claim 1, wherein a first layer in the series of layers is adjacent to a front end of line (FEOL) layer of the integrated circuit.

3. The integrated circuit of claim 1, wherein the series of layers are part of a back end of line (BEOL) portion of the integrated circuit.

4. The integrated circuit of claim 1, wherein pillars of the plurality of pillar metals in a first layer of the series of layers are connected to a driver pin.

5. The integrated circuit of claim 1, wherein a final layer in the series of layers connects with a structure in a package of the integrated circuit.

6. The integrated circuit of claim 1, wherein a width for each of the plurality of pillar metals is a function of a switching frequency of signals carried by the plurality of pillar metals, and wherein the plurality of pillar metals mitigate electromigration effects in the integrated circuit.

7. The integrated circuit of claim 1, wherein the plurality of pillar metals in each of the series of layers are spaced to be substantially symmetric, and wherein the plurality of pillar metals are located with a vertical rectangular column through the series of layers that comprises a footprint within the series of layers that is a subsection within a whole footprint of the series of layers.

8. A device, comprising:
a first plurality of metal bars arranged to be parallel within a first set of layers of a plurality of layers;
a second plurality of metal bars arranged to be parallel within a second set of layers of the plurality of layers and arranged to be perpendicular with the first plurality of metal bars;
a plurality of vias connecting the first plurality of metal bars and the second plurality of metal bars at points of overlap between adjacent layers of the plurality of layers,
wherein the first plurality of metal bars and the second plurality of metal bars are within a same rectangular footprint.

9. The device of claim 8, wherein the plurality of vias connect the first plurality of metal bars and the second plurality of metal bars to form an electrically connected grid of metal interconnects in the device.

10. The device of claim 9, wherein the grid connects a driver pin between the plurality of layers of the device with components of the device to provide electric signals to the components.

11. The device of claim 8, wherein successive layers of the plurality of layers include successively fewer metal bars than a number of metal bars in a first layer of the plurality of layers, and wherein the first layer of the plurality of layers is beneath a second layer and adjacent to a front end of line (FEOL) layer of the device.

12. The device of claim 8, wherein the first plurality of metal bars and the second plurality of metal bars are spaced substantially symmetrically within layers of the plurality of layers that are back end of line (BEOL) layers, and wherein one or more of the first or second plurality of metal bars are truncated to avoid additional structures routed through the plurality of layers.

13. The device of claim 8, wherein the first and the second plurality of metal bars are located within a vertical rectangular column through the plurality of layers that comprises a footprint within the plurality of layers that is a subsection within a whole footprint of the series of layers.

14. An integrated circuit, comprising:
- a series of layers that are part of a back end of line (BEOL) portion of the integrated circuit, wherein a first layer is adjacent to a front end of line (FEOL) layer of the integrated circuit, and wherein a final layer in the series of layers connects a driver pin layer with a structure in a package of the integrated circuit;
- a plurality of pillar metals in each of the series of layers, wherein pillars within each of the series of layers are oriented to be parallel, wherein pillars in adjacent layers are aligned to be perpendicular with pillars in adjoining layers, wherein each of the plurality of pillar metals is a rectangular segment of metal, and wherein the plurality of pillar metals form a reconvergent mesh grid; and
- a plurality of vias connecting the plurality of parallel pillar metals between the series of layers, wherein vias of the plurality of vias are located at intersections in the reconvergent mesh grid.

\* \* \* \* \*